United States Patent
Simpson et al.

(10) Patent No.: US 11,548,086 B2
(45) Date of Patent: Jan. 10, 2023

(54) METHOD FOR SELECTIVELY PRETINNING A GUIDEWIRE CORE

(71) Applicant: Abbott Cardiovascular Systems Inc., Santa Clara, CA (US)

(72) Inventors: John A. Simpson, Carlsbad, CA (US); Jeffrey F. Dooley, Santa Clara, CA (US); Matthew J. Gillick, Murrieta, CA (US)

(73) Assignee: Abbott Cardiovascular Systems Inc., Santa Clara, CA (US)

( * ) Notice: Subject to any disclaimer, the term of this patent is extended or adjusted under 35 U.S.C. 154(b) by 449 days.

(21) Appl. No.: 16/723,781

(22) Filed: Dec. 20, 2019

(65) Prior Publication Data

US 2020/0122258 A1 Apr. 23, 2020

Related U.S. Application Data

(62) Division of application No. 15/438,502, filed on Feb. 21, 2017, now Pat. No. 10,556,287.

(51) Int. Cl.
*C23C 2/38* (2006.01)
*B23K 1/20* (2006.01)
*B23K 3/06* (2006.01)
*B23K 35/02* (2006.01)
*B23K 35/30* (2006.01)
(Continued)

(52) U.S. Cl.
CPC .............. *B23K 1/203* (2013.01); *B05C 3/00* (2013.01); *B05C 3/172* (2013.01); *B05D 7/20* (2013.01); *B23K 1/0008* (2013.01); *B23K 1/08* (2013.01); *B23K 1/20* (2013.01); *B23K 3/0669* (2013.01); *B23K 35/0227* (2013.01); *B23K 35/3013* (2013.01); *C23C 2/003* (2013.01); *C23C 2/02* (2013.01); *C23C 2/04* (2013.01); *C23C 2/08* (2013.01); *C23C 2/26* (2013.01); *C23C 2/38* (2013.01); *B05D 2256/00* (2013.01); *B23K 2101/32* (2018.08)

(58) Field of Classification Search
None
See application file for complete search history.

(56) References Cited

U.S. PATENT DOCUMENTS 2,344,589 A * 3/1944 Bogner ................ B23K 3/0646
228/33
3,799,789 A * 3/1974 Pierre-Louis et al. .... C23C 2/08
427/175
(Continued)

FOREIGN PATENT DOCUMENTS

EP 747021 A2 12/1996
EP 2604231 A2 6/2013
JP 2006100709 A * 4/2006

OTHER PUBLICATIONS

Machine Translation of JP-2006100709-A, retrieved Aug. 3, 2022.*
International Search Report, European Patent Office, dated May 13, 2016.

*Primary Examiner* — David P Turocy
(74) *Attorney, Agent, or Firm* — Fulwider Patton LLP

(57) ABSTRACT

A method of pretinning a guidewire core made of shape memory alloy and having an elongate axis, comprising: placing a ball of solder in a pocket in a soldering block; melting the ball of solder; holding a guidewire core over the ball of solder; lowering the guidewire core into the ball of solder; removing the guidewire from the ball of solder.

8 Claims, 6 Drawing Sheets

(51) Int. Cl.
*C23C 2/00* (2006.01)
*C23C 2/02* (2006.01)
*C23C 2/04* (2006.01)
*C23C 2/26* (2006.01)
*B23K 1/08* (2006.01)
*C23C 2/08* (2006.01)
*B23K 1/00* (2006.01)
*B05C 3/172* (2006.01)
*B05C 3/00* (2006.01)
*B05D 7/20* (2006.01)
*B23K 101/32* (2006.01)

(56) References Cited

U.S. PATENT DOCUMENTS

| | | | |
|---|---|---|---|
| 3,874,068 A * | 4/1975 | Cook | H01R 43/0249 228/180.1 |
| 5,330,801 A * | 7/1994 | Monteiro | B23K 1/08 427/310 |
| 5,662,969 A * | 9/1997 | Ling | C23C 2/24 118/712 |
| 5,944,727 A | 8/1999 | Ahari et al. | |
| 5,968,052 A | 10/1999 | Sullivan et al. | |
| 6,599,296 B1 | 7/2003 | Gillick et al. | |
| 7,993,384 B2 | 8/2011 | Wu et al. | |
| 9,211,206 B2 | 12/2015 | Pryor | |
| 2003/0191516 A1 | 10/2003 | Weldon et al. | |
| 2006/0173524 A1 | 8/2006 | Salahieh et al. | |
| 2007/0244540 A1 | 10/2007 | Pryor | |
| 2008/0208209 A1 | 8/2008 | Fischer et al. | |
| 2009/0105798 A1 | 4/2009 | Koch | |
| 2009/0171433 A1 | 7/2009 | Melsheimer | |
| 2011/0190862 A1 | 8/2011 | Bashiri et al. | |
| 2012/0290066 A1 | 11/2012 | Nabulsi et al. | |
| 2012/0330396 A1 | 12/2012 | Costello | |

* cited by examiner

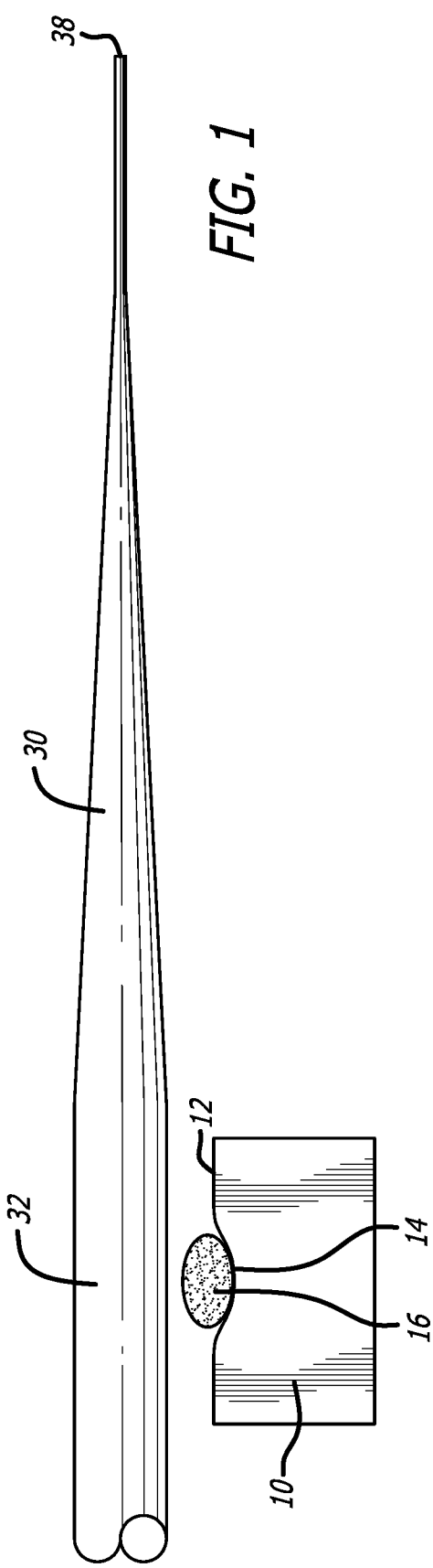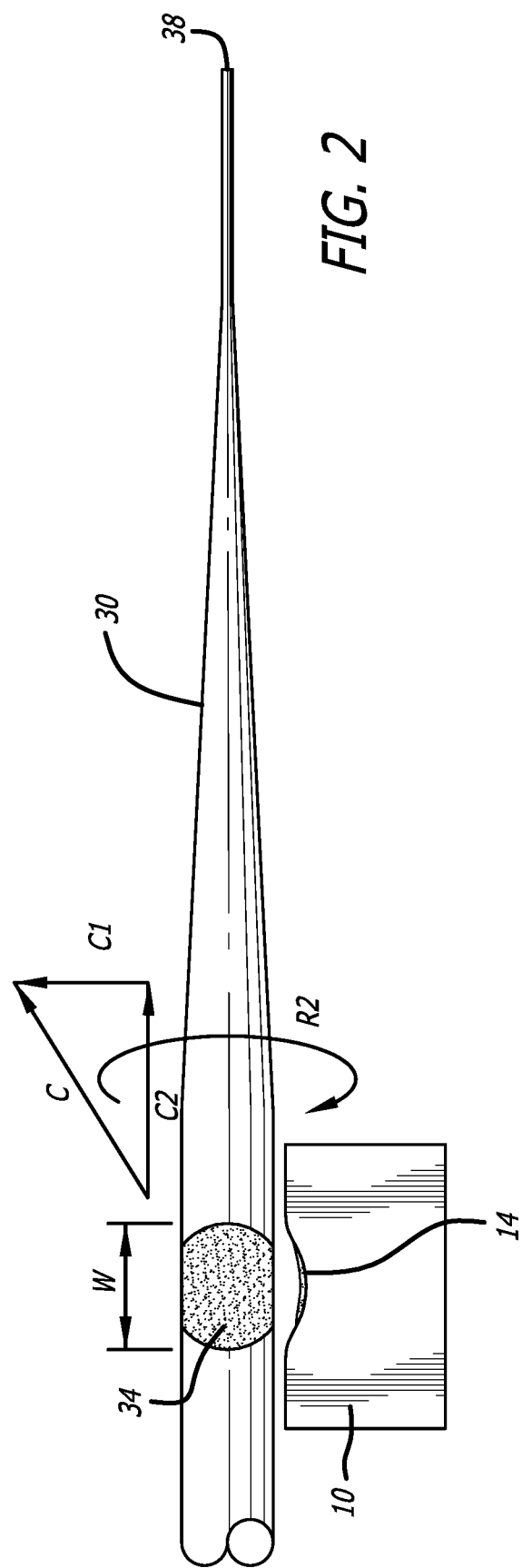

METHOD FOR SELECTIVELY PRETINNING A GUIDEWIRE CORE

CROSS-REFERENCE TO RELATED APPLICATIONS

This is a divisional based on U.S. Ser. No. 15/438,502, filed on Feb. 21, 2017, incorporated herein by reference in its entirety.

BACKGROUND

It is known in the art to form guidewires for placement in the human anatomy. Many guidewires are fabricated from a superelastic Nitinol (nickel titanium) alloy. In some known methods of guidewire fabrication and assembly, the distal end of the nitinol core is "pretinned" with a solder alloy to enable subsequent assembly by soldering a coil onto the distal end.

Such known methods may include a pretinning process which involves a heated crucible containing several pounds of molten solder and a cover layer of molten flux. The molten solder may be a mixture of tin and gold, and as a consequence the value of a solder station known in the art may be between $40,000 to $50,000. The flux may be a eutectic mixture of sodium hydroxide and potassium hydroxide. The distal end of each core wire is plunged or dipped into the crucible multiple times, resulting in a pretinned section approximately 5 cm long that is readily solderable at any point along that length using the type of flux typically used for stainless steel.

In some guidewire designs, the entire nitinol core wire is in the superelastic condition, having been previously cold worked via wire drawing then heat treated at about 500° C. to straighten the drawn wire and impart superelasticity. Because superelastic nitinol has already been heat treated at a higher temperature than will be encountered during the pretinning procedure, this pretinning method may affect straightness of the wire if the wire is bent while exposed to pretinning temperatures. That is, the bend will become permanent. (However, it is a characteristic of superelastic NiTi that has been previously cold worked prior to heat treatment, that its straightness will not be impacted where it is held straight while being heated in a pretinning process)

However, in other designs, the tip of the guidewire core may be treated, by various different means including by cold working, to remove the superelastic properties. This leaves the tip capable of being deformed permanently by the user. A design and method following such a process is disclosed in application Ser. No. 14/042,321 which is co-owned by the applicant company. It is incorporated herein in full, by reference. Thus, where the user requires a J tip, a micro-J tip, or other desired shape to facilitate threading the guidewire in a complex anatomy, such shape may be imparted to the tip manually before insertion into the patient. In the case of such guidewire core, the method of pretinning described above, wherein the distal end of each core wire is plunged into the crucible multiple times up to a depth of about 5 cm, causes significant distortion to occur in the cold worked section.

As further background, the need for pretinning nitinol core wires arises before they are soldered. Soldering fluxes that enable solder alloys to wet nitinol are commercially available so, in theory, pretinning before assembly should be unnecessary. However, certain alloys that are frequently used for their other beneficial characteristics, (for example, Indium Alloys' Flux #2 and Flux #3) volatilize when heated and leave considerable residue that can tenaciously mask areas where solder is intended to flow. Further, such residue can be challenging to remove, particularly when trapped within coils or other features having little clearance and poor line-of-sight inspectability.

In this respect, non-removed residue is highly undesirable because it can cause subsequent corrosion of the solder or substrate materials. For this reason, it is advantageous to pre-tin and completely remove all pre-tinning flux residue while it is exposed and readily visible, and then use an easier-to-remove flux when subsequently soldering the pretinned nitinol core wires into assemblies. For example, fluxes used for soldering stainless steels or precious metals are aqueous solutions containing zinc chloride and hydrochloric acid, and their residue does not exhibit a masking effect and is far easier to remove from coils and other low-clearance features.

Thus, there is in the art, a need for a method for pretinning guidewire cores made from superelastic alloys, which avoids the above problem. The present invention addresses these and other needs.

SUMMARY OF THE INVENTION

In one embodiment, the invention is a system for applying a layer of solder to a core wire for a guidewire. The invention comprises a number of elements. A soldering block is provided having a first upper surface that defines a crucible having a bottom surface positioned below the first upper surface. A beam is provided to extend transverse to the soldering block and having a second upper surface in a horizontal plane, the second upper surface defining a groove, the groove being sized to receive the core wire, the beam further defining a space sized to receive a portion of the soldering block that includes the crucible, wherein the groove is interrupted by the space so that the groove extends in a straight configuration on opposite sides of the soldering block.

In some embodiments, the second upper surface further defines a reservoir shaped to be in fluid communication with the groove, wherein the groove is further sized so that, when the reservoir is filled with a flux, the groove draws flux from the reservoir by capillary action. In other embodiments, the beam is attached to a structure that is movable vertically upward and downward in relation to the soldering block, and preferably, the structure may comprise two arms parallel to each other, each arm having a first end and a second end, wherein the first end of each arm is attached respectively to a rotatable joint for permitting each arm to pivot about the rotatable joint, and wherein the beam at opposite ends is attached respectively to the second end of each arm. In yet further embodiments, the first upper surface may be an alloy formed from one of titanium, tantalum, zirconium and tungsten, and yet further, the alloy may be commercially pure titanium. In other embodiments again, the crucible may define two slots on opposite sides of the crucible, each slot sized to be small enough to maintain molten solder within the crucible by surface tension, and large enough to permit a core wire to be slidingly inserted into each of the two slots simultaneously.

In another embodiment, the invention is a method for pretinning a core wire for a guidewire having an elongate axis. The method comprises placing a ball of solder within a crucible in a soldering block. The ball of solder is melted to produce a molten ball of solder. A quantity of flux is placed in a reservoir, and the flux is allowed to migrate by capillary action into a linear groove defined by a beam positioned adjacent the crucible. A first portion of the core wire is inserted in the flux. Then the first portion is moved laterally (horizontally) in a first direction. The first portion of the core wire is inserted into the molten ball of solder, while maintaining the core wire in a straight configuration with the elongate axis oriented horizontally.

In some embodiments, moving the first portion laterally in a first direction includes moving the first portion into a position above the molten ball of solder and, thereafter, lowering the core wire and thereby inserting the first portion into the molten ball of solder. In other embodiments, maintaining the core wire in a straight configuration with the elongate axis oriented horizontally includes maintaining the core wire within the linear groove on a first side of the crucible, and within a grooved support on a second side of the crucible opposite the first side. In yet other embodiments, the invention further includes moving the core wire laterally in a second direction opposite the first direction, thereby moving the first portion out of the molten ball of solder and into the quantity of flux. Additionally, in a further embodiment, further moving the core wire laterally in the first direction, thereby moving the first portion back into the molten ball of solder. And yet further, repeating the steps of moving the core wire laterally in the second direction, followed by moving the core wire laterally in the first direction, one or more times. And additionally, directly after a movement in which the core wire has been moved in the second direction, lifting the wire out of the molten ball of solder.

In a further embodiment, melting the ball of solder may include dimensioning the molten ball of solder in relation to the crucible such that an upper portion of the molten ball of solder is maintained in a stable position above an upper rim of the crucible by surface tension. In some embodiments under this approach, inserting the first portion of the core wire into the molten ball of solder may include inserting the core wire into an upper portion of solder that is above the upper rim of the crucible. In yet further embodiments, inserting the first portion of the core wire into the molten ball of solder may include inserting the core wire between at least one of two slots formed on opposite sides of the crucible.

In yet another embodiment, the invention is a method of pretinning a core wire for a guidewire having an elongate axis. In this embodiment, the invention comprises placing a ball of solder within a pocket in a soldering block. The ball of solder is melted. A core wire is held over the ball of solder, with the elongate axis in a horizontal orientation. A portion of the core wire is lowered into the ball of solder while maintaining the elongate axis in a horizontal orientation. Then, the core wire is removed from the ball of solder.

In some embodiments, a sponge may be advanced, soaked in a flux, into contact with the core wire before lowering the core wire into the ball of solder. Further, advancing a sponge soaked in a flux into contact with the core wire may include rotating the core wire about the elongate axis. Additionally, advancing a sponge soaked in flux may include advancing a sponge mounted on a jig. In further embodiments, further including retracting the sponge from the core wire after advancing the sponge. Under the embodiment presently described, lowering a portion of the core wire into the ball of solder includes rotating the core wire about the elongate axis. In embodiments, removing the core wire from the ball of solder may include moving the core wire in a direction having a vector component along the elongate axis and a vector component vertically, perpendicular to the elongate axis. In further embodiments, a ratio of the vector component along the elongate axis to the vector component perpendicular to the elongate axis is in a range of between 2.5 to 3.5. In other embodiments, placing a ball of solder in a pocket may include placing a ball of solder which is a 80Au/20Sn eutectic solder alloy. Further, placing a ball of solder in a pocket may include placing a ball of solder which is in a range of 2 mm to 5 mm in diameter. Yet other embodiments may include repeating the steps of lowering the core wire into the ball of solder and then removing the guidewire from the ball of solder between three to five times. And in other embodiments, lowering a portion of the core wire into the ball of solder may include lowering a portion of the core wire that is located between 2 cm and 4 cm from a distal tip of the guidewire core into the ball of solder.

In yet another embodiment, the invention is a system for applying a layer of solder to a core wire for a guidewire. The invention comprises a soldering block having a first upper surface that defines a pocket having a depressed surface positioned below the first upper surface. A flux applicator is provided, comprising a horizontally extending rod and a sponge attached to a distal tip of the rod, the sponge being soaked in a flux and positioned adjacent the soldering block; a ball of solder resting on the depressed surface, the ball having a second upper surface protruding to a level above the first upper surface. In some embodiments, the ball of solder may be a 80Au/20Sn eutectic solder alloy. In other embodiments, the ball of solder may be in a range of 2 mm-5 mm in diameter. Preferably, the first upper surface may be formed from a titanium alloy. In other embodiments, the first upper surface may be formed from an alloy of at least one of tantalum, zirconium and tungsten.

These and other advantages of the invention will become apparent when read in conjunction with the brief description of the drawings, and the detailed description of some embodiments.

BRIEF DESCRIPTION OF THE DRAWINGS

FIG. 1 is a partial schematic view of a configuration of elements showing a step of an embodiment of the invention in front view.

FIG. 2 is a partial schematic view of a configuration of elements showing a further step of an embodiment of the invention in front view.

DETAILED DESCRIPTION OF SOME EMBODIMENTS

Figure 3:
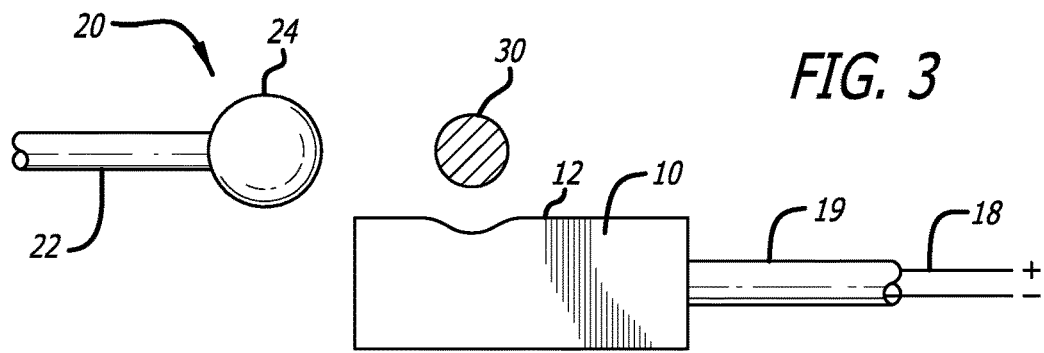
FIG. 3 is a partial schematic view of a configuration of elements showing a step of an embodiment of the invention in side view.
Figure 4:
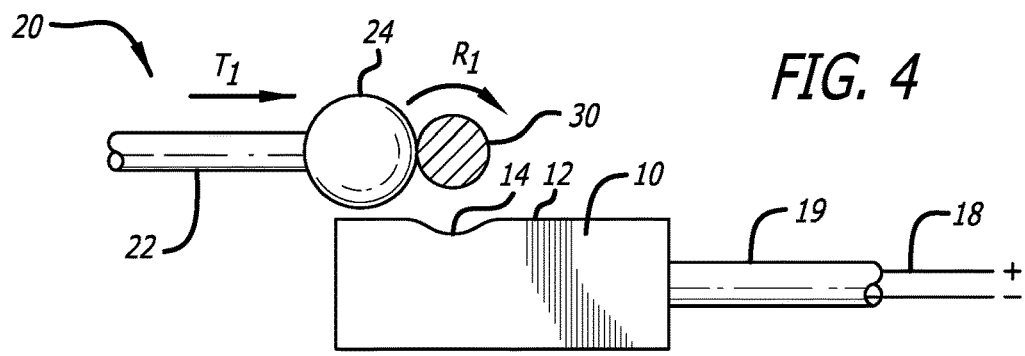
FIG. 4 is a partial schematic view of a configuration of elements showing a further step of an embodiment of the invention in side view.

The present invention is described with reference to the figures. In some embodiments, the invention is a method of fabricating a guidewire.

With reference to FIGS. 1-2 and FIGS. 3-6, a novel and useful method is described that addresses the problems described above as encountered in the prior art.

First, a soldering block 10 is provided, configured to have a flat upper horizontal surface 12. At least one pocket or depression is formed in the horizontal surface to form a crucible having a bottom surface 14, sized to hold a small solder ball 16. The upper surface 12 may act as an upper rim of the crucible. The soldering block contains a heating element and is connected via electric cables 18 to an electric power supply (not shown), for heating the soldering block 10 and thereby the solder ball 16 by known means. The soldering block, or at least its upper surface 12, is made of a material that is not wetted by a flux/solder combination that will be used. It has been found that commercially pure titanium (not less than 99.2% pure) serves this purpose, but other materials which form highly protective oxide layers, such as tantalum, zirconium or tungsten, may also be used.

Next, a flux applicator 20 is provided and positioned adjacent the soldering block 10. FIGS. 3-6 show that this applicator 20 comprises a horizontally extending rod 22. At a distal tip of the rod, a sponge 24 is attached, suitable for absorbing a quantity of flux. The applicator 20 may be mounted in a jig (not shown) so that it may be advanced towards a position over the soldering block (arrow T1, FIG. 4) under mechanical control, and then withdrawn therefrom (arrow T2, FIG. 5).

While several commercial soldering fluxes are known to work for nitinol, Indium Corporation makes two fluxes that have been experimentally proven, namely Indalloy Flux #2 and Indalloy Flux #3. The residue of the former is more readily dissolved in heated water and is thus easier to remove after pretinning, so Flux #2 is generally preferred over Flux #3.

Once the system is set up as described above, the process of pretinning a guidewire core may commence according to the following methodology.

First, a guidewire core 30 is positioned above the pocket 14 of the soldering block 10. This configuration is exemplified in FIG. 3.

The core 30 is lined up over the pocket 14 at a location 32 (FIG. 1) upon which it is desired to deposit a pretinning solder with flux. The location 32 may be located a length of about 3 cm from the core tip 38. At the location 32 where pretinning will take place, the nitinol may be superelastic. However, this is not a requirement, and, depending on product design, the nitinol may be cold worked in this location and yet still fall within the scope of this invention.

Then, the applicator 20, on which a sponge 24 is loaded with a suitable flux, is advanced (arrow T1, FIG. 4) upon the jig towards the core 30, and the sponge is pressed up against the core 30.

The core 30 may be rotated about its axis (arrow R1, FIG. 4) so that flux becomes evenly distributed about the circumference of the core.

Figure 5:
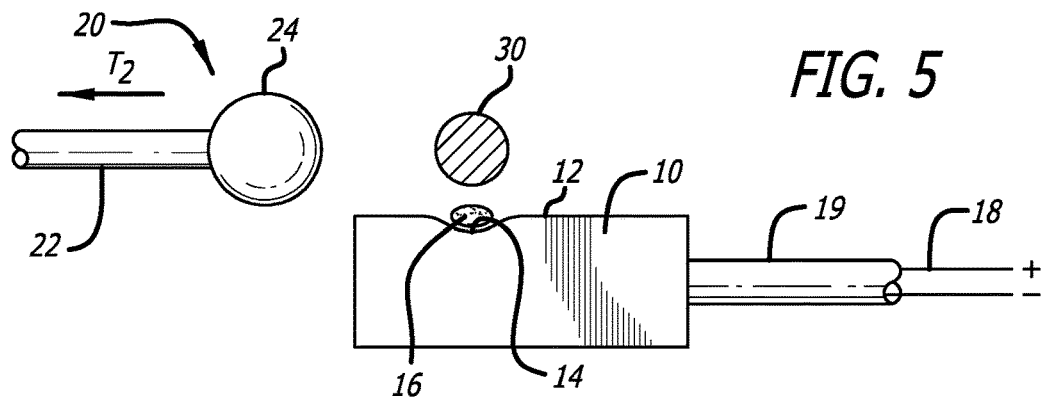
FIG. 5 is a partial schematic view of a configuration of elements showing yet a further step of an embodiment of the invention in side view.

The applicator 20 is then withdrawn from the core (arrow T2, FIG. 5)

A small ball of solder 16 (about 2 mm to 5 mm diameter) is inserted into the pocket 14, where it is melted by electric power supplied to the soldering block 10 according to known means. It will be understood that the ball of solder 16 may be inserted into the pocket at an earlier stage. Due to surface tension in the molten solder, and the absence of wetting by the surface of the soldering block due to its metallurgical qualities, the ball of solder sits exposed proud of the upper surface 12, as may be envisaged with reference to FIG. 1 and FIG. 5.

The core 30 is then slowly lowered into the ball of solder 16 (arrow V1, FIG. 6) so that it is partially submerged at selected location 32 along the length of the core 30. It is important that the wire remain straight while thus submerged, to avoid heat-setting it into a bent configuration where it is heated by the molten solder.

Figure 6:
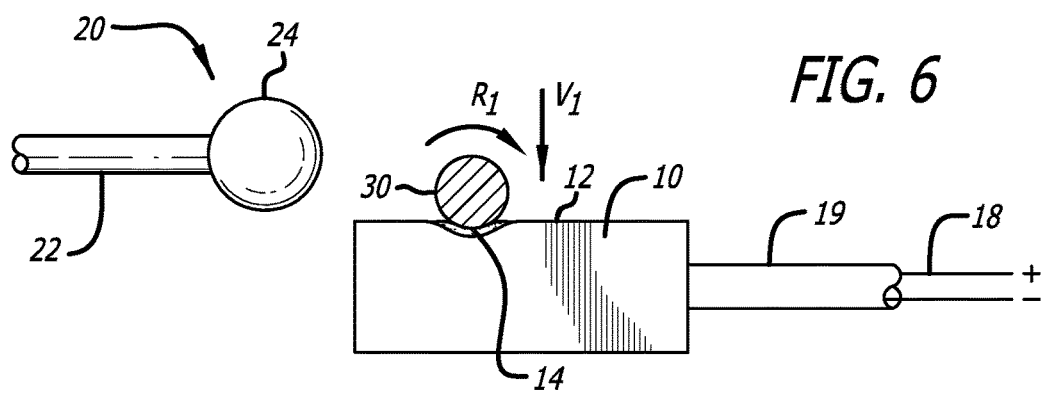
FIG. 6 is a partial schematic view of a configuration of elements showing yet a further step of an embodiment of the invention in side view.

The core may then be slowly rotated about its axis (arrow R2, FIG. 6). Due to the fact that the core does not possess the non-wetting qualities of the upper surface 12 and it is also bathed in flux, the molten solder attaches itself to the surface of the core in a circumferential band 34 (FIG. 2) of limited width "W" (FIG. 2) of about 2-5 mm, where, upon withdrawal, the attached solder solidifies and presents a localized spot for attaching further structure by soldering at a later stage. However, if the molten solder ball is larger in diameter than the nitinol core wire, it will surround the immersed nitinol wire, thereby eliminating the need to rotate the nitinol core about its axis. Hence, upon careful adjustment of the size of the solder ball, core rotation may be avoided to simplify the process.

Upon withdrawing the core 30 from the ball of solder 16, it has also been found helpful to withdraw the tinned section with a large lateral vector of movement (arrow C2, FIG. 2) with only a small component of vertical movement (arrow C1, FIG. 2). This avoids a thick, lumpy pretin coating which can occur if the vertical component is large, caused by distortion of the ball due to surface tension associated cooling at the top of the distorted solder mass. Preferably, the ratio of C2/C1 is in the range between 2.5 and 3.5. However, successful withdrawal does not necessarily depend on the ratio of lateral to vertical movement. Another useful method for successful withdrawal is to move the nitinol wire laterally such that a flux-free section of the wire resides within the molten solder before withdrawal. In the absence of flux, nitinol is naturally repelled by molten solder and thus the wire can simply be moved vertically (radially) to remove it without solder dragout. Taking advantage of natural wire/solder repulsion is a simple method to attaining a "neat" withdrawal.

Multiple cycles of flux application and solder submersion may be required in a preferred range of three to five cycles, before a band of suitable pretinning is obtained on the guidewire core.

The process above describes pretinning having features of the invention. The present invention thus offers several advantages over prior art nitinol pretinning processes.

Figure 7:
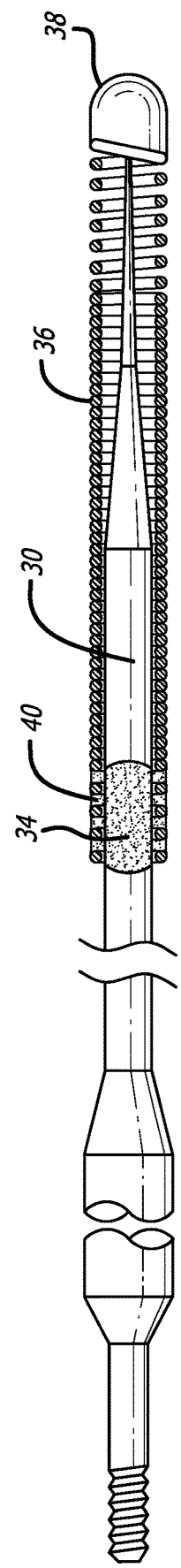
FIG. 7 is a partial schematic view of a guidewire formed according to the method of an embodiment of the invention, with a coil attached to a core at a location where pretinning has been achieved.

Once the core 30 has been pretinned 34 at a desired location 32, the core is ready to receive additional components of the guidewire such as a coil, extending towards the tip of the guidewire. As seen in FIG. 7, a guidewire core 30 has a coil 36 attached which extends from a tip 38 of the guidewire proximally, and is attached by solder 40 to the core. The pretinned solder 34 coincides with the location of the attachment solder 40, and this provides a robust and secure point at which the coil is attached to the core.

Some advantages:

Pretinning under the present invention can be applied only where needed for subsequent solder joints, thus minimizing heat exposure of the cold-worked section in products that feature nitinol tip technology, and thus minimizes core wire distortion during guide wire manufacturing.

Pretinning can be performed at multiple locations along the core wire by the same operator at a single workstation. Through appropriate fixture design, core wires can be held by a single fixture which enables pretinning at all desired locations.

Pretinning can be performed "just-in-time" by operators on final assembly lines using simple tools and fixtures with a conventional flux and existing solder stations, rather than off-line in a "batch" mode using a house-made caustic flux blend and capital equipment.

The molten solder volume required is dramatically reduced, thus minimizing the amount of gold at risk of theft (the value of the gold in one prior art pretinning station may be in the region of about $40,000-$50,000; the solder may contain 80% gold by weight). Further, the large volume of solder in the prior art process must be replaced regularly due to an inevitable drift in composition, generally from tin loss, that leads to increases in the molten solder's liquidus and ultimately degradation in pretin coating quality due to nodules of proeutectic gold-rich phase.

Figure 8:
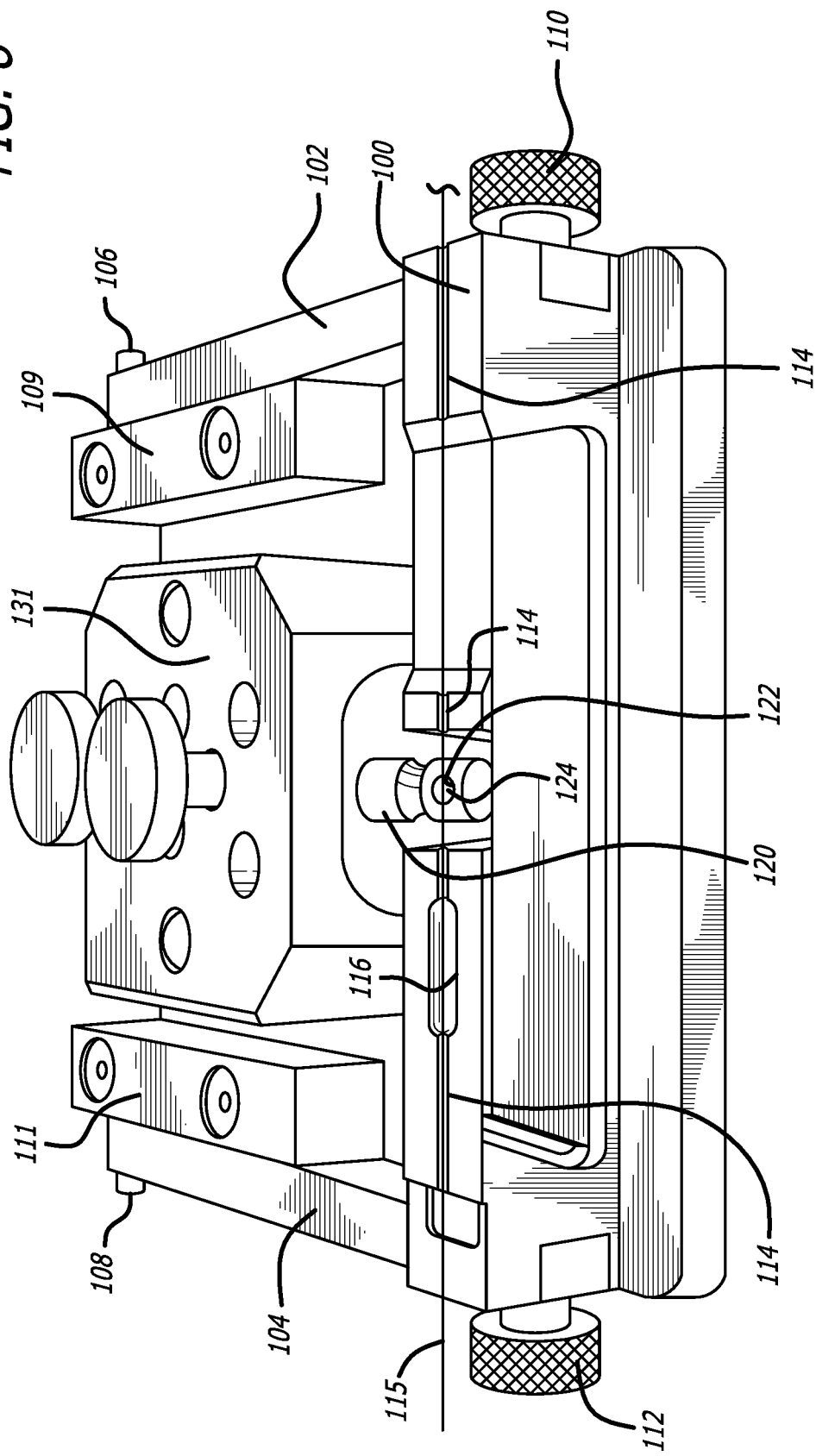
FIG. 8 is a perspective view of some components of a system for applying a layer of solder to a core for a guidewire, having features of an embodiment of the invention.

In another embodiment, exemplified in FIGS. 8-12, a further system and method is provided for facilitating the application of solder to a core wire. This system uses some of the elements of the previous embodiment, insofar as a crucible is provide in a soldering block, capable of receiving a blob of solder for melting, and retaining the solder so that a portion of the solder may be held above the upper surface of the block by the action of surface tension. This system comprises a beam 100 which, in some embodiments, spans between two arms 102, 104, and which is removably connected to the arms by two threaded knobs 110, 112 which may also be used as convenient points for holding and manipulating the beam during the pre-tinning process. The arms are fixed at pivot points 106, 108 to a fixed base 109, 111 so that the beam 100 may be raised vertically while the arms pivot about their respective pivot points. (FIG. 8.) The upper surface of the beam is shaped to provide the following features. A groove 114 runs across the entire length of the beam (although it may be interrupted in places). The groove is sized to receive a guidewire core 115 along the length of the core during a pre-tinning process. A reservoir 116 which is sized to be filled with flux, straddles and interrupts the groove 114, so that when the reservoir is filled with flux the groove is also always filled with flux which is drawn from the reservoir by capillary action. This way, a guidewire core inserted into the groove will always have flux applied to the portion of the wire adjacent the reservoir.

The upper surface of the beam 100 is also interrupted by an opening 118 sized to receive a soldering iron tip 120 (Weller™ provides a suitable soldering iron) that may be heated electrically while it may be controlled electronically. The tip 120 defines a crucible or bowl 122 suitable for receiving a ball of solder 124 (such as described above) that will be heated to melting. The quantity of solder will be sufficient so that, in combination with the non-wettable substance forming the bowl (also described above), the solder stands proud of the circumferential lip of the bowl by about 3 mm, held there by surface tension. This will allow the horizontally oriented core wire 115 to be inserted into the solder without the core wire being bent. Additionally, as exemplified in FIGS. 11-12, vertical slots 130 may be provided on the lip of the bowl 122 and sized so that flux residue may drain out of the slots while the solder is held back inside the bowl by surface tension of the solder. The slots may be simultaneously sized so that the core wire can pass through the slots, as an alternative to passing above the level of the lip of the bowl. In this way, the horizontally oriented core wire 115 can enter the solder without being bent. In one embodiment, the slots may be sized such that the depth of the slot "D" (FIG. 11-12) is 1.5 mm (in the range of 1.3 mm-1.7 mm), and the width of the slot "W" is 0.5 mm (in the range of 0.4 mm-0.6 mm).

The tip 120 is connected to a base 131 which contains an electronic system (not shown) providing power to the soldering block. Below the bowl 122, a catchment basin 126 resides above a surface 123 that is not part of the beam. The basin 126 is configured to catch any solder that may spill over the sides of the bowl 122 during the process, and is further configured to be removable for heating to recover the spilled solder due to its high value gold content.

Thus, in operation, after the reservoir 116 has been filled with flux and the bowl 122 has been filled with a ball of molten solder 124 which stands proud of the lip of the bowl, a guidewire core 115 may be inserted into the groove 110. The height of the core may be adjusted vertically above the solder ball 124 by adjusting the height of the beam 100 manually manipulating the two knobs 110, 112, or using an automated mechanism to control the arms 102, 104. Thus, the core wire 115 may be lowered into the molten solder ball and then lifted out again at a later stage, without the core wire 115 being bent at any stage of this process. This is due to the height of the solder standing proud of the bowl 122 under surface tension, or, due to slots 130 in the side wall of the bowl 122 giving access to the wire 115 in its straight configuration. This aspect of not bending the core wire is important in order to avoid the core wire assuming a permanently bent condition upon removal from the high temperature molten solder. Any bend in the wire which receives such elevated temperatures will tend to set the core wire, in its metallurgical state, to assume the bend as a permanent configuration.

Figure 9:
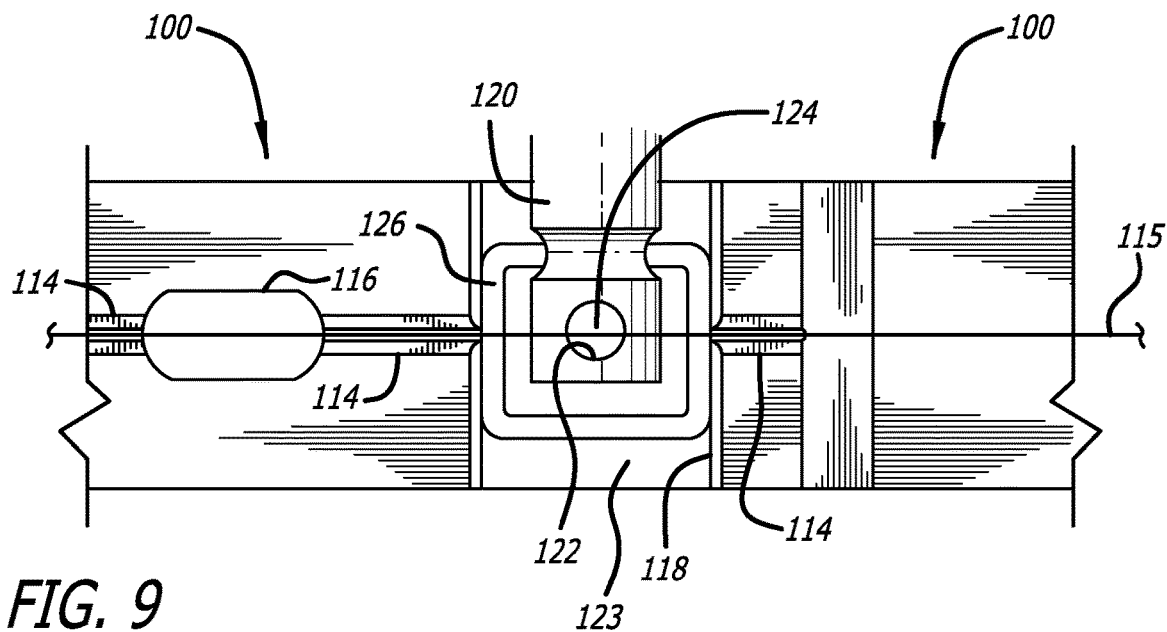
FIG. 9 is a detail view of a component of the system in FIG. 8, seen from above.
Figure 10:
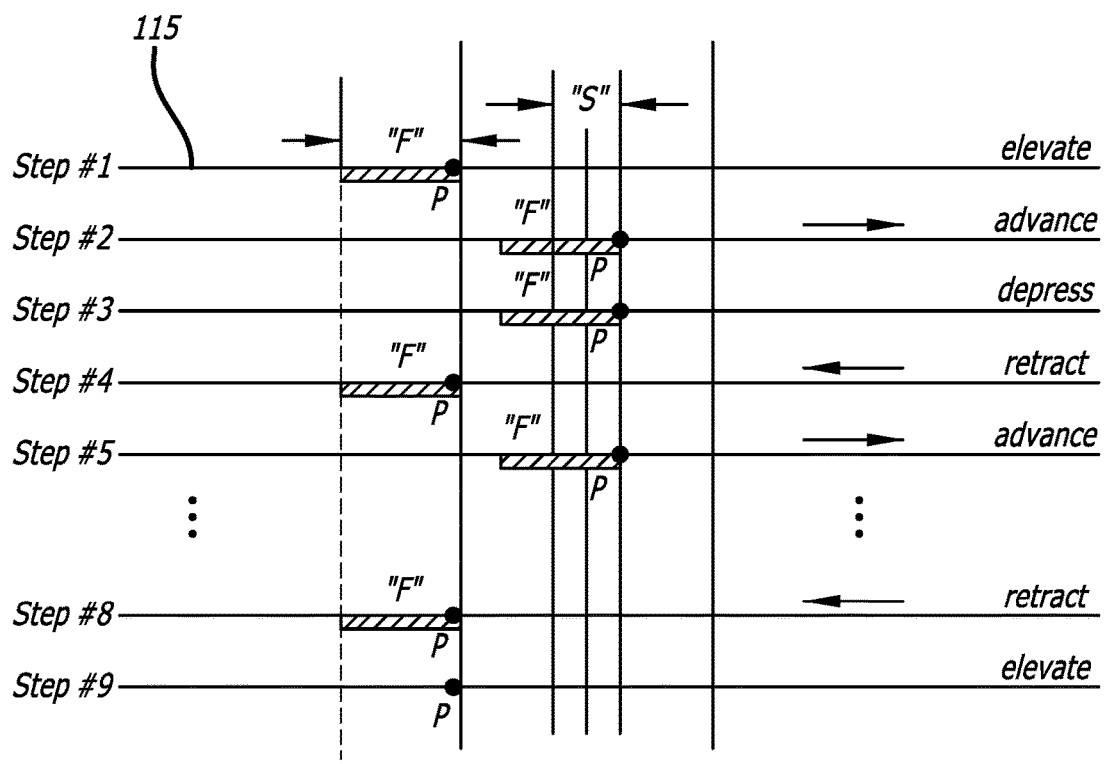
FIG. 10 is a schematic drawing showing steps taken in another embodiment of the invention in relation to components shown in FIG. 9.
Figure 11:
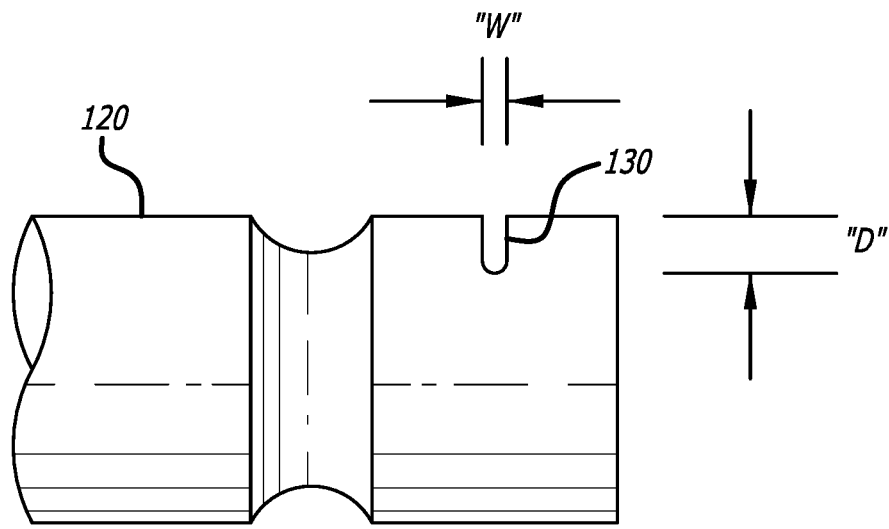
FIG. 11 is a side view of a tip of a soldering block used in an embodiment of the invention.
Figure 12:
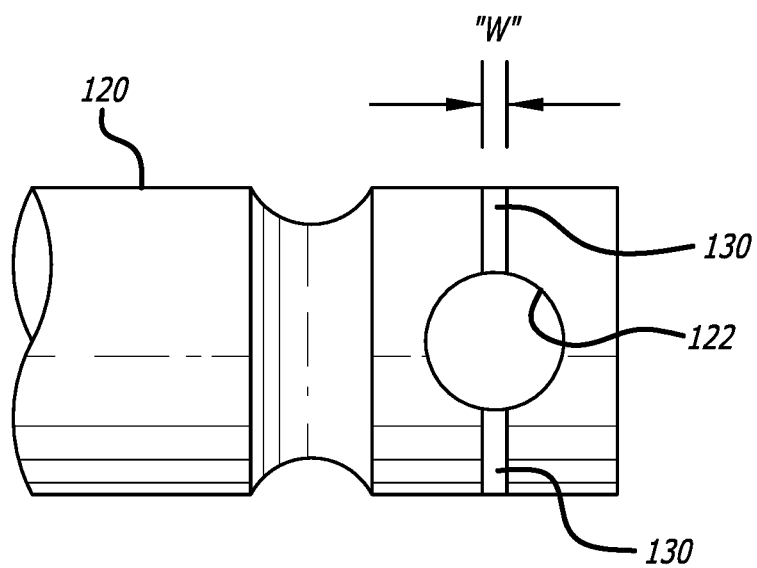
FIG. 12 is a top view of the tip of a soldering block shown in FIG. 11.

A preferred process for pretinning the guidewire core may be applied as follows, with reference to FIGS. 9 and 10. These steps are suitable for use in a manual process and in an automated process. FIG. 9 shows a detail view of the central portion of FIG. 8, while FIG. 10 represents, in schematic form, the steps taken and schematically shows a wire core 115 positioned in a groove of a beam, and being advanced and retracted in relation to the elongate axis of the beam 100 which is shown above FIG. 10, in FIG. 9. The symbol "S" between arrows shows the location of the solder ball 124 in relation to the core wire 115. The symbol "F" between arrows shows the region in the groove 114 where flux is introduced via capillary action from the reservoir, and therefore identifies a region on the wire which may be coated in flux. The dot on the wire 115 shown adjacent the symbol "P" indicates the same point on the wire, that is moved left and right during the various steps of the method, and assists the reader in following the process described. The region adjacent the letter "P" shown in hatched shading and marked "F" also indicates the region on the wire which has been coated in flux during the process.

Step 1: A core wire 115 is positioned within the groove 114 extending along a beam 100 as shown in FIGS. 8-9, and is elevated upwards in relation to a ball of molten solder 124 by rotating the arms 102, 104 upwards so that the core wire is not inserted into the ball of solder at "S". Flux is inserted into the reservoir 116, so that the groove portion, between the reservoir and the ball of solder, fills up with flux under capillary action. At this stage, the point "P" on the core wire may be aligned (as seen from above) with an end of the groove which is filled with flux and the region "F" on the wire will be coated in flux.

Step 2. While still holding the wire 115 above the ball of solder 124, the wire is advanced so that the point "P" passes beyond the region "S"; and, the region "F" on the wire which has been coated in flux is, at least partially, positioned above the solder ball 124 within the region "S". It will be appreciated that under this configuration, the core wire 115 straddles across the ball of solder 124 and is supported on either side by the groove 114. On one side, the groove is filled with flux, as described, and on the other side the groove is dry. This arrangement maintains the wire 115 in a straight configuration throughout the process, oriented horizontally. Thus, the process is highly suited to automation.

Step 3: The beam 100 is pivoted downward about the arms 102, 104, so that the wire 115 is depressed downwardly and inserted into the ball of solder 124 in the center. The point "P" remains aligned as it was (as seen from above) as in step 2 so that the region "F" on the wire that is coated with flux is pressed into the solder. When dropping the wire down into the molten solder ball, it is preferred that this section of the wire be coated in flux so that it immediately begins wetting. If not flux coated, the wire may be strongly repelled by the solder, which may tend to deflect the wire and cause the resulting bend region to become permanently bent due to the solder's elevated temperature.

Step 4: Holding the elevation of the core wire constant and positioned within the solder ball by holding the beam 100 immovable, the wire 115 is gripped (by mechanical means where an automated process, by hand where manual) and is retracted by sliding the point "P" laterally toward the reservoir 116 and away from the solder ball 124 so that the portion of the wire initially covered in flux in step 1 and step 2 is now wetted with solder, and it leaves the ball of solder so that a region of wire uncoated by flux enters the solder ball. This action also causes the region "F" to be then re-coated with flux from the groove, on top of the existing coat of solder. The region of wire uncoated by flux that enters the solder ball is not wetted by the solder, so that when it is eventually advanced out of the solder ball (steps below) it remains clean and uncoated by solder.

Step 5: Continuing to hold the elevation of the wire constant, the core wire 115 is again gripped and is advanced by sliding the point "P" laterally towards and through the solder ball 124 and away from the reservoir 116 so that the region "F" has been inserted into and re-wetted with a fresh coat of flux.

Step 6 and Step 7: Step 4 and step 5 may be repeated a number of times, as necessary until the built-up coat of solder is acceptable. Once again, in repeating the advancing step 5, a portion "F" of core wire that has been coated with flux during the previous step 4 is inserted into the ball of solder which consequently wets that portion of the wire with solder. It will be appreciated that the portion of core wire that was inside the ball of solder during retracting step 4 will simply be pushed out of the solder during step 5 without being wetted by solder, due to the fact that that portion of the wire has not been coated with any flux during the process.

Step 8: When it is decided that sufficient repetitions (if any) of step 4 and step 5 have taken place to coat the core wire adequately with solder, it is ensured that the core wire is in the retracted condition (the same as at the end of step 4) and with a portion of wire, that at no stage has been coated with flux, positioned inside the ball of solder 124.

Step 9: The beam 100 is then elevated by rotating the arms 102, 104 upwards. This may be done manually, or automatically under mechanical action. The portion of wire within the ball of solder is elevated out of the solder. However, due to the non-wetted state of the wire inside the solder, which at no stage has been coated with flux under the described process, it will not pull any solder away with it. It is important to ensure that the wire inside the solder has not been coated with flux by this stage of elevating the wire, because otherwise its coated state will cause "icicles" or blobs of excess solder to form as the wire is pulled away and drags solder with it.

After a number of core wires have been coated according to this procedure, the wires may be taken off for cleaning in a bath of heated water with ultrasonic action, which has been found suitable for cleaning off the flux used. It is feasible to use a dilute citric acid solution to promote the removal of flux residue.

In a variation of the above method, a core wire may be solder-coated on its terminal end (tip) by adhering to the general description provided above except that, while the wire may be inserted into the groove as before, the wire may be positioned not to straddle the molten ball of solder 124, but rather so that the tip of the wire may be positioned in the flux in the groove 114. From this position, the wire may be linearly advanced and retracted in and out of the molten ball of solder without the need to elevate the wire above the ball of solder at any stage. Thus, the beam may remain stationary, without elevating it and depressing it through rotation about the pinned arms. It will be appreciated that the tip, repeatedly coated in flux during the retraction step, may be horizontally inserted repeatedly into the molten ball of solder during the advance step to build up a tip that is well coated in solder. The method does not require any portion of wire to be removed vertically out of the solder, as is required as the terminal step when the wire straddles the ball of solder as described above. When the wire's terminal end is withdrawn from the ball of solder by an axial movement, the problem of blobs of solder that may form on the wire, does not arise Thus, the various embodiments of the invention provide an advantageous system and method for pre-tinning core guidewire with solder, and addresses problems found in the prior art. The present invention may, of course, be carried out in other specific ways than those herein set forth without departing from the essential characteristics of the invention. The present embodiments are, therefore, to be considered in all respects as illustrative and not restrictive, while the scope of the invention is set forth in the claims that follow.

We claim:

1. A method for pretinning a core wire for a guidewire having an elongate axis, comprising:
    placing a ball of solder within a crucible in a soldering block;
    melting the ball of solder to produce a molten ball of solder;
    placing a quantity of flux in a reservoir, and allowing the flux to migrate by capillary action into a linear groove defined by a beam positioned adjacent the crucible;
    inserting a first portion of the core wire in the flux, thereby covering the first portion in flux;
    then moving the first portion laterally in a first direction, thereby inserting the first portion of the core wire into the molten ball of solder and, due to the flux, wetting the first portion with solder, while maintaining the core wire in a straight configuration with the elongate axis oriented horizontally;

followed by, moving the core wire laterally in a second direction opposite the first direction, thereby moving the first portion out of the molten ball of solder and into the quantity of flux, thereby re-covering the first portion in flux, and also thereby simultaneously moving a second portion of the core wire, adjacent the first portion and which has not been covered in flux, into the molten ball of solder;

followed by, moving the core wire laterally in the first direction, thereby moving the first portion back into the molten ball of solder and, simultaneously, moving the second portion out of the ball of solder, whereby, due to absence of flux covering the second portion, the second portion is not wetted with solder.

2. The method of claim 1, wherein moving the first portion laterally in a first direction includes moving the first portion into a position above the molten ball of solder and, thereafter, lowering the core wire and thereby inserting the first portion into the molten ball of solder.

3. The method of claim 1, wherein maintaining the core wire in a straight configuration with the elongate axis oriented horizontally includes maintaining the core wire within the linear groove on a first side of the crucible, and within a grooved support on a second side of the crucible opposite the first side.

4. The method of claim 1 further repeating the steps of moving the core wire laterally in the second direction, followed by moving the core wire laterally in the first direction, one or more times.

5. The method of claim 4 including, directly after the core wire has been moved in the second direction, lifting the wire out of the molten ball of solder.

6. The method of claim 1, wherein melting the ball of solder includes dimensioning the molten ball of solder in relation to the crucible such that an upper portion of the molten ball of solder is maintained in a stable position above an upper rim of the crucible by surface tension.

7. The method of claim 6 wherein inserting the first portion of the core wire into the molten ball of solder includes inserting the core wire into an upper portion of solder that is above the upper rim of the crucible.

8. The method of claim 1, wherein inserting the first portion of the core wire into the molten ball of solder includes inserting the core wire between at least one of two slots formed on opposite sides of the crucible.

* * * * *